United States Patent [19]

Brendzel

[11] Patent Number: 5,950,174
[45] Date of Patent: Sep. 7, 1999

[54] AFFILIATION-BASED ARRANGEMENT FOR BILLING

[75] Inventor: Henry Tzvi Brendzel, Millburn, N.J.

[73] Assignee: AT&T Corp., Middletown, N.J.

[21] Appl. No.: 08/846,078

[22] Filed: Apr. 25, 1997

[51] Int. Cl.[6] .......................... G06F 17/60; G06F 151/00
[52] U.S. Cl. ................ 705/34; 705/30; 705/40; 705/39; 707/1; 707/7; 379/114
[58] Field of Search .................. 705/1, 14, 16, 705/17, 23, 30, 34, 39, 40, 42, 45; 707/1, 7; 235/379, 380; 380/24; 379/114, 115, 144

[56] References Cited

U.S. PATENT DOCUMENTS

| | | | |
|---|---|---|---|
| 5,326,959 | 7/1994 | Perazza | 235/379 |
| 5,350,906 | 9/1994 | Brody et al. | 235/379 |
| 5,383,113 | 1/1995 | Kight | 705/40 |
| 5,465,206 | 11/1995 | Hilt et al. | 705/40 |
| 5,483,445 | 1/1996 | Pickering | 705/40 |
| 5,649,117 | 7/1997 | Landry | 705/40 |
| 5,655,089 | 8/1997 | Bucci | 705/40 |
| 5,668,993 | 9/1997 | Peters et al. | 395/671 |
| 5,684,965 | 11/1997 | Pickering | 705/34 |
| 5,826,243 | 10/1998 | Musamanno et al. | 705/35 |
| 5,864,830 | 1/1999 | Armetta et al. | 705/41 |

*Primary Examiner*—Robert A. Weinhardt
*Assistant Examiner*—Nicholas David Rosen

[57] ABSTRACT

An improved system is realized with an arrangement which takes advantage of affiliations that allow concentration of billing. In situations where a party is willing to serve as a financial surrogate for some subscribers of a services provider, savings can be realized by sending the bills for charges accrued by those subscribers ("affiliated subscribers") directly to such a surrogate. The surrogate pays the bills of the affiliated subscribers and may make its own arrangement with the affiliated subscribers to be appropriately compensated. The disclosed method and arrangement employs an affiliation database file to provide information as to who is a financial surrogate for others. Data which affiliates particular subscribers to particular financial surrogates may be under control of the services provider or under control of the financial surrogates. The billing process utilizes the information that identifies financial surrogates and the information about the affiliations of affiliated subscribers. Illustratively, the billing process may begin by first processing the bills for the financial surrogates and thereafter addressing the remaining bills.

43 Claims, 3 Drawing Sheets

AFFILIATION-BASED ARRANGEMENT FOR BILLING

BACKGROUND

This relates to billing and, more particularly, to billing in a communication services environment.

Competition in the provision of services generally, and particularly the fierce competition in the provision of communication services, calls for continued efforts into means and methods to reduce costs. The processes employed to bill for services are no exception.

SUMMARY

An improved system is realized with an arrangement which takes advantage of affiliations that allow concentration of billing. Specifically, in situations where a party is willing to serve as a financial surrogate for some subscribers of a services provider, savings can be realized by sending the bills for charges accrued by those subscribers ("affiliated subscribers") directly to such a surrogate. The surrogate pays the bills of the affiliated subscribers and may make its own arrangement with the affiliated subscribers to be appropriately compensated.

The savings realized by avoiding the billing and collection processes for multiple subscribers can be passed on to the affiliated subscribers and/or to the party that serves as the financial surrogate. In situations where the financial surrogate is itself a subscriber of the services provider, the compensation can be effected by means of a reduction on the surrogate's bill.

The disclosed method and arrangement employs an affiliation database file to provide information as to who is a financial surrogate for others. Data which affiliates particular subscribers to particular financial surrogates may be under control of the services provider or under control of the financial surrogates. The billing process utilizes the information that identifies financial surrogates and the information about the affiliations of affiliated subscribers. Illustratively, the billing process may begin by first processing the bills for the financial surrogates and thereafter addressing the remaining bills.

DETAILED DESCRIPTION

Figure 1:
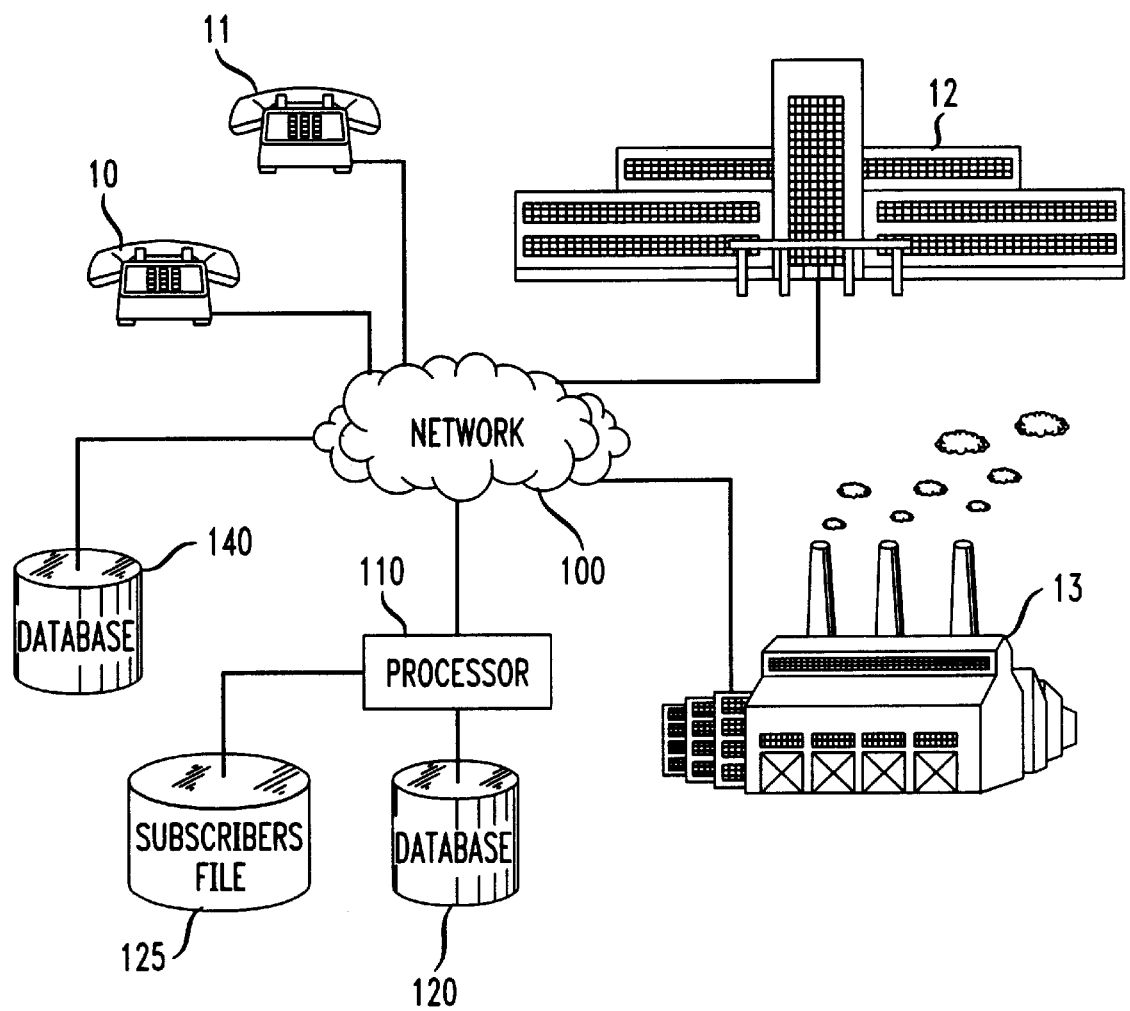
FIG. 1 presents a general diagram of a billing system in accordance with the principles disclosed herein.

To illustrate the principles disclosed herein, FIG. 1 presents a high-level view of a communication network comprising a network 100, telephone sets 10 and 11 connected to network 100, businesses 12 and 13 connected to network 100 (each having perhaps many communication instruments connected to the network; e.g., key systems, PBXs, Centrex, etc.), billing processor 110 connected to network 100, billing database 120 coupled to processor 110, subscribers file 125 also coupled to processor 110, and an affiliation database 140 that is accessible to processor 110. Illustratively, database 140 is accessible to processor 110 through network 100, although in other arrangements it could be directly coupled to processor 110. It may be worth noting that although FIG. 1 shows only telephone sets 10 and 11, the intent is to depict communication equipment generally including, for example, data terminal equipment (DTE).

On one level, and with the exception of affiliation database 140, the arrangement of FIG. 1 depicts a conventional arrangement for billing for communication services. To briefly summarize, when a user at telephone 10, for example, calls telephone 11, network 100 determines whether a billing event has been triggered. If so, a billing record entry is made in database 120 to record a charge against the account associated with telephone 10. At the end of a billing cycle, processor 110 uses subscribers file 125 and database 120 to process the billing records for all billing accounts in order to accumulate the charges billable to the accounts for communication services received. Thereafter, processor 110 applies whatever charging and discounting algorithms have been selected for the particular subscriber to generate and print out a bill, and causes the bill to be mailed to the appropriate subscriber.

This conventional billing approach is improved, in accordance with the principles disclosed herein, by recognizing the benefits of concentration. Business 12, which may have many telephone instruments and correspondingly many employees, may choose, for example, to pay for all fixed communication charges levied against its employees (e.g., the fixed monthly charge). Additionally, or alternatively, it may choose to pay for the variable communication charges against its employees (probably bounded by some fixed amount, and the fixed amount can be set according to the position of the employee in the business), or whatever other arrangement suits its purposes. This could constitute a service, or a fringe benefit, that business 12 offers to its employees. In such a case, those employees of business 12 who are subscribers of a communication service provider would be "affiliated subscribers" of that provider, and business 12 would be a financial surrogate for those affiliated subscribers.

Business 13, on the other hand, might wish to act as a financial surrogate for entities (people and/or businesses other than its employees) with whom, typically, business 13 has a financial relationship. That is, business 13 might choose to accept bills for communication service charges which were incurred by those entities, and pay those bills on behalf of those entities. (In the context of this disclosure, the term "service charges" includes usage charges.) Of course, such a business would then look to those entities to be reimbursed for that payment. For example, business 13 may be the provider of charge cards, such as AT&T's Universal Card Services (AT&T-UCS). The communication charges accrued by holders of AT&T-UCS credit cards would be submitted to AT&T-UCS, those charges would be paid by AT&T-UCS, and AT&T-UCS would then apply the paid charges to the account of its card holders (who are affiliated subscribers of the communication services provider). Another example might be a university that acts as a financial surrogate for its students.

The benefits to the billing arrangement disclosed herein are clear because, as will be evident from the discussion below, the number of bills that need to be submitted for payment is smaller, and that translates to lower billing costs for the communications provider. Moreover, both the bills and the payments can be transmitted electronically. Some of the financial benefit accruing to the provider can be shared by providing a discount on the charges levied against the affiliated subscribers, or shared among the affiliated subscribers and the financial surrogates (e.g., businesses 12 and 13, in the above example).

Figure 2:
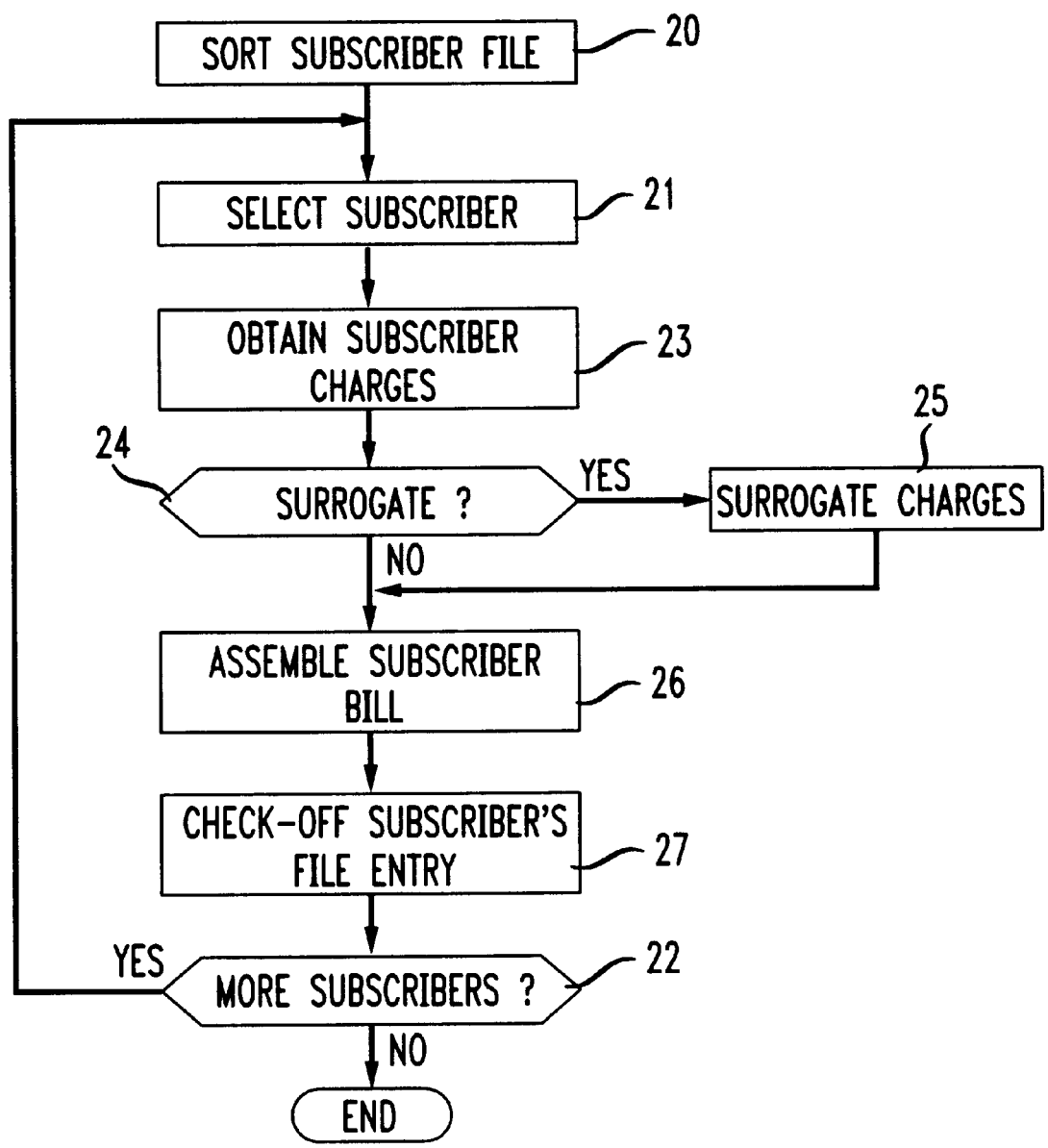
FIG. 2 is a flow diagram of one embodiment of the disclosed billing method.

FIG. 2 presents a flow chart of the improved billing process. Before this flowchart is explained, however, a note about the financial surrogate information that needs to be available to the communication services provider. First, the communications provider needs to know who (i.e., a commercial entity) constitutes a financial surrogate for others. The financial surrogate may, or may not, be a subscriber of the communication services provider, and the others are subscribers of the communication services provider who are affiliated with the surrogate. Secondly, the communications provider needs to have access to information that associates, or affiliates, specific affiliated subscribers to specific financial surrogates. Of course, this information can be provided in a number of ways. One way is for all such information to be resident centrally with the communication service provider—for example, in the same storage device where file 125 is stored. Alternatively, the information may be distributed. That as is, each financial surrogate can keep a record of all of its subscribers on whose behalf the financial surrogate is willing to act. The only requirement, of course, is that billing processor 110 needs to have access to the affiliation databases—e.g., database 140.

As to the information regarding who is a surrogate, in an embodiment that employs separate, dispersed, affiliation databases, such as depicted in FIG. 1, the simplest approach is to modify the subscribers file 125 to identify whether a subscriber is a financial surrogate for others. Although the above suggests that the financial surrogate is also a subscriber of the communication services provider (since it is present in subscribers file 125), strictly speaking, this need not be the case. Thus, the subscribers file 125 can be modified as illustrated below by adding the "Affiliation DB" column and that column may include, as illustrated below, a phone number where the identity of the affiliated subscribers can be found.

TABLE 1

| Name | Other information | Affiliation DB |
|---|---|---|
| JBClamp Widget Company | | 201 431-0001 |
| AmWeigh Corp. | | |
| American Cardx | | 201 666-0011 |
| Charlie Brown | | |
| AT&T-UCS | | 301 888-0002 |
| Ziggy Jones | | |
| Dilbert Adams | | |
| Kari Zmatic | | |
| Sha Kran | | |

Thus, in the above illustrative table, entities JBClamp Widget Company, American Cardx, and AT&T-UCS are financial surrogates for others because the "Affiliation DB" column is populated with phone numbers, and those phone numbers specify where a database can be accessed to get information about the affiliated subscribers of the communication services provider.

When carrying out the billing functions, the prior art process may simply select a subscriber from the subscribers file 125, access database 120 where the billing records are found, collect the charges for the subscriber, form a bill, and forward it to the subscriber. The next subscriber is then selected from file 125 and the process repeats until all subscribers have been accounted for. The precise prior art billing process is not important to the instant disclosure, and it is mentioned here only as an aid to understanding the functions that elements 120 and 125 serve.

When carrying out the billing functions in accordance with the improvements disclosed herein, the process of going though subscribers file 125 can be carried out in a number of ways. One reasonably efficient way is to order the file so that the surrogate entries are taken first. For the above example, the table would therefore include entities JBClamp Widget Company, American Cardx, and AT&T-UCS as the first entries in the sorted table.

Addressing now FIG. 2, block 20 sorts subscribers file 125 (i.e., Table I), as necessary. The table includes a working "check-off" column (which is not shown) and all entries in that column are "un-checked" by block 20 to indicate that the billing process for the current billing cycle has started. Block 21 then accesses the sorted file and selects the next party that is not checked-off (beginning with the first entry, of course). Block 23 obtains the accrued communication charges for the selected subscriber, qua a communications subscriber, from billing database 120 and passes control to block 24 which evaluates the selected party and determines whether the selected party is a financial surrogate for others (i.e., whether the "Affiliation DB" column is populated). If so, control passes to block 25. Otherwise, control passes to block 26. At the end of the process carried out by block 25, control also passes to block 26, where the bill for the selected subscriber is assembled and forwarded to the subscriber. (There is always a bill that is created for a party selected from the subscribers file. Either it is because the party is a subscriber or because the party is a surrogate, or both. ) Thereafter, in block 27 the subscriber's entry in subscribers file 125 is checked-off to indicate that the subscriber selected in block 21 has been billed, and control passes to block 22. Block 22 determines whether there are more unchecked-off subscribers that can be selected in the subscribers database file. If so, control returns to block 21. Otherwise, the process ends.

Figure 3:
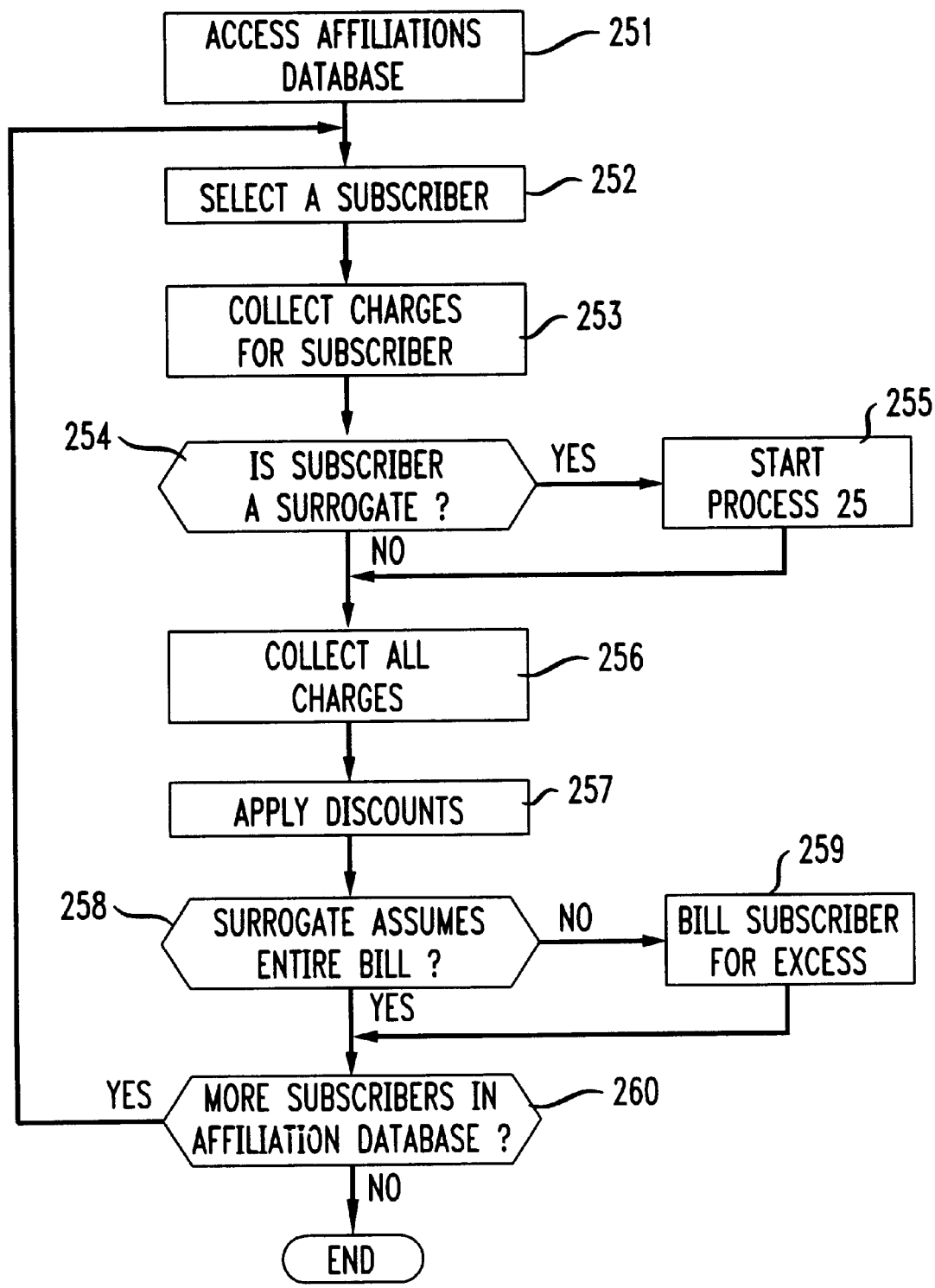
FIG. 3 presents details of a block depicted in FIG. 2.

The process indicated by block 25, which is initiated when a selected subscriber is a financial surrogate for others, is shown in greater detail in FIG. 3. It begins with block 251 where the specified affiliation database is accessed. In the embodiments illustrated in FIG. 1, the accessing is achieved by means of processor 110 connecting itself (e.g., via a modem) to a database found at the telephone number specified in the Affiliation DB column (e.g., database 140). This is achieved with conventional modem software. The affiliation database contains a list in any one of acceptable formats. A simple listing or a table may suffice.

Block 252 selects a subscriber from the list found in database 140, finds that subscriber in subscribers file 125 and checks-off that entry in file 125. Block 253 collects the charges owed by the subscriber (as the user of communication services) and block 254 determines whether the subscriber selected from the file in database 140, while being an affiliated subscriber, is also a surrogate for others. In the illustrated example, this is ascertained from the entry in the Affiliation DB. (In other embodiments, this information might, instead, be included in subscribers file 125.) If the subscriber selected from affiliation database 140 is also a surrogate for others, then control passes to block 255 which starts a new iteration of the block 25 process.

Since this is an iterative process, control eventually returns to, and the billing process continues in, block 256 just as if the subscriber selected from database 140 were not a surrogate for others. Block 256 collects all of the accrued communication charges for the selected affiliated subscriber (as a subscriber and as a surrogate). Block 257 applies whatever discounts apply to the selected affiliated subscriber and passes control to block 258. Block 258 determines whether the surrogate will assume responsibility for the entire bill of the selected affiliated subscriber, or only for a portion. If the entire bill is assumed, control passes to block 260. Otherwise, block 259 is interposed, where a bill for the excess amount is prepared for the selected affiliated subscriber. Block 260 determines whether there are more selected affiliated subscribers in the affiliation database. If so, control returns to block 252. Otherwise, the process of block 25 terminates.

In the example above, the first entry in the sorted version of Table I is, for example, the JBClamp Widget company. Step 23 determines the accrued communication charges for JBClamp Widget company as a communication subscriber and control passes to block 25. Then, the affiliation database at telephone number (201) 431-0001 is accessed, and there, by way of illustration, the names of Charlie Brown and Dilbert Adams are found. Step 252 selects Charlie Brown and checks off that name in subscribers file 125, step 253 collects the charges for Charlie Brown, the process proceeds through steps 254, 256–260, the charges for Dilbert Adams are added, and the process terminates upon exit at block 260. Control passes to block 26 (of FIG. 2), the JBClamp Widget company is checked off in subscribers file 125, and control returns to block 21.

The next entry selected from the sorted version of Table I is, for example, AT&T-UCS. Its charges are collected, its affiliation database is accessed at (301) 888-0002, and there, illustratively, one finds Am Weigh Corp. However, the entry for Am Weigh Corp. includes a non-blank entry in the Affiliation DB column of the table found at (301) 888-0002 (which table is controlled by AT&T-UCS). For example, the entry for Am Weigh Corp. at (301) 888-0002 includes the number (201) 957-3400. This indicates that while AT&T-UCS is a financial surrogate for Am Weigh Corp., Am Weigh Corp. is, in turn, a financial surrogate for others. In accordance with this information, when the Am Weigh Corp. entry is handled by the process of block 25 (following a connection to the list found at 301-888-0002), control passes from block 254 to block 255, which starts a new iteration and looks at the subscribers identified by Am Weigh Corp. in a database that it controls which is accessed at (201) 957-3400. Illustratively, that database identifies the affiliated subscriber Sha Kran.

Following AT&T-UCS, the entry selected in the sorted version of Table I is American Cardx, and here too it is determined that the subscriber is a financial surrogate for others. When accessing the affiliation database at 201-666-0011, illustratively, Kari Zmatic is found, so the process of FIG. 2 and FIG. 3 handles the bill for American Cardx as a communications subscriber and the bill for Kari Zmatic.

When control returns to block 21, the only subscriber in Table I that has not been checked off is Ziggy Jones, so the process of FIG. 2 handles that bill, and pursuant to block 22, the entire billing process ends.

It may be noted that the above-described method for going through the list of subscribers is merely illustrative, and that other specific methods can be employed. For example, if the identities of all affiliated subscribers is made known to the communication service provider, then subscriber file 125 can affiliate the surrogates with the affiliated subscribers. File 125 can then be sorted, for example, to first handle those subscribers who have no surrogate, then affiliated subscribers who are not surrogates for others, then affiliated subscribers who are a surrogate for others, and lastly the remaining surrogates. In the example of Table I above, the subscriber list would be modified and sorted as follows:

TABLE II

| Name | Other information | Surrogate |
| --- | --- | --- |
| Ziggy Jones | | |
| Sha Kran | | Am Weigh |
| Kari Zmatic | | American Cardx |
| Dilbert Adams | | JBClamp |
| Charlie Brown | | JBClamp |
| Am Weigh Corp. | | AT&T UCS |
| JBClamp Widget Company | | |
| American Cardx | | |
| AT&T UCS | | |

By proceeding down the list, the charges of subscribers that have surrogates can be accumulated in the surrogates' accounts (in database 120), and when the bills of the surrogates are handled, the bills for the affiliated subscribers are swept in. This methodology can also be applied to billing the surrogates' accounts "on the fly", as the communication charges are being accrued by the affiliated subscribers.

One of the primary advantages of the above-disclosed billing method is, of course, a saving in billing costs. When a plurality of businesses, with perhaps thousands of employees each, chooses to serve as a financial surrogate for their employees, the communication service provider sends out thousands fewer bills and processes thousands fewer payments, thereby saving money in both billing and payment posting processes. Of course, it is not only businesses with thousands of employees that provide a cost savings benefit to the communication service provider. Even a dozen employees, forming an "affiliation group," markedly add to the cost reduction benefits that the communications service provider obtains. Each bill sent out to a financial surrogate enumerates the charges that are owed by the financial surrogate as a communication subscriber (if the surrogate is a subscriber) and it also enumerates the charges for all subscribers on whose behalf the financial surrogate acts.

Bills received by surrogates for their affiliated subscribers may be itemized or not itemized. Specifically, the bills that are sent out to the surrogate may include the full set of information about accrued charges attributed to each affiliated subscriber, a summary of the charges, or merely the final amount. The latter is particularly attractive in applications where the surrogate chooses to pay only a set amount of the full bill of the subscriber.

The method disclosed herein does not call for a change in the relationship of responsibility for the incurred telecommunication service charges. Each of the subscribers remains responsible for the charges the subscriber incurs, and merely from a billing perspective are the subscriber's charges combined in a single bill with the charges incurred by the financial surrogate and with the charges of other subscribers on whose behalf the financial surrogate acts.

While the above discloses two basically equivalent processes for concentrating the process of billing for communication services, it should be appreciated that other processes can also be employed. For example, although both processes contemplate sorting of the subscribers file in order to simplify the billing process, it is of course possible to not sort but to operate in a manner that some might call "haphazardly"—that is, without particular regard to who is a financial surrogate and who is not, who has a financial surrogate and who does not—as long as all of the subscribers in the file are checked-off.

While the above discussion is couched in terms of telecommunication services, it should be understood that the inventive concept disclosed herein extends to any situations where a provider of services has a regular business with a set of subscribers, such as a cable company, or a utility. Also in this context and in the context of the claims that follow, the term "service" encompasses the service of providing goods (e.g. water, electricity, etc.).

I claim:

1. A method for billing, carried out in a computer, to account for services provided by a provider, comprising the steps of:

selecting a party from an electronically accessible subscribers file;

ascertaining the location of electronically accessible stored data when said selected party is a financial surrogate, which data contains identities of affiliated subscribers;

accessing said data;

for each affiliated subscriber identified in said data, adding an amount to an account; and forwarding a request for payment to the financial surrogate for an amount indicated by said account.

2. The method of claim 1 further comprising a step of marking said party and all subscribers in said subscribers file who are affiliated with said party as having been accounted for, and a step of repeating the steps of claim 1 where the step of selecting selects from said subscribers file a party that is not accounted for.

3. The method of claim 1 where said stored data is under control of said financial surrogate.

4. The method of claim 1 where the subscribers file is under control of the provider.

5. The method of claim 1 where the amount is fixed.

6. The method of claim 1 where the amount corresponds to at least a portion of service charges incurred by the affiliated subscriber.

7. The method of claim 1 where the amount corresponds to charges incurred by the affiliated subscriber and at least a portion of service charges incurred by subscribers who are affiliated with the affiliated subscriber.

8. The method of claim 1 where the amount corresponds to the entirety of service charges incurred by the affiliated subscriber.

9. The method of claim 6 where the charges are retrieved from a billing database maintained by the service provider.

10. The method of claim 1 where the amount corresponds to a fixed monthly charge levied on the affiliated subscriber.

11. The method of claim 1 where the amount corresponds to service charges incurred by the affiliated subscriber for a particular type of service.

12. The method of claim 11 where the type of service is local communication service.

13. The method of claim 1 further comprising a step, preceding the step of selecting, of sorting the subscribers file.

14. The method of claim 1 wherein the selected party is an employer of the affiliated subscribers identified in said data.

15. The method of claim 1 where the selected party has a financial relationship with the affiliated subscribers identified in said data.

16. The method of claim 1 where the destination is at other than where the subscriber's file is located.

17. The method of claim 1 where the destination is a port of a communication network.

18. The method of claim 17 where the port is specified by a telephone number.

19. The method of claim 18 where the step of accessing comprises the computer connecting itself to the port specified by the telephone number.

20. The method of claim 1 where the step of forwarding a request for payment is effected by electronic transmission.

21. The method of claim 1 further comprising the step of forwarding a request for payment to said party when said financial surrogate fails to pay said amount.

22. A method carried out in a computer for billing for services of a provider, comprising the steps of:

from a subscribers file, selecting a party that is financially responsible to the provider for service charges, accessing an electronic database containing financial surrogate information, determining, from said database, whether a financial surrogate is specified for said party, which characterizes said party as an affiliated subscriber, when said party is an affiliated subscriber, adding to an account of said financial surrogate an amount which corresponds to at least a portion of the affiliated subscriber's service charges, forwarding a request for payment to said financial surrogate which includes said amount, and forwarding a request for payment to said party in the event said financial surrogate fails to pay said amount.

23. A method carried out in a computer for billing for services of a provider, comprising the steps of:

from a subscribers file, selecting a party that has not been accounted for and which is financially responsible to the provider for service charges, accessing an electronic database containing financial surrogate information, determining, from said database, whether a financial surrogate is specified for said party, which characterizes said party as an affiliated subscriber, when said party is an affiliated subscriber, adding to an account of said financial surrogate a billing amount which corresponds to at least a portion of the affiliated subscriber's service charges, and marking said affiliated subscriber as being accounted for, repeating the step of selecting a party that is not accounted for, the step of determining, and the step of adding when the selected party is an affiliated subscriber of some financial surrogate from a set of financial surrogates, as long as there are parties in the subscribers file that have not been accounted for, forwarding a request for payment to each of said financial surrogates which includes the amount associated with each of said financial surrogates and forwarding a request for payment to said party in the event said financial surrogate fails to pay said amount.

24. The method of claim 23 where the portion of the billing amount is fixed.

25. The method of claim 23 where the portion of the billing amount is bounded by a preselected amount.

26. The method of claim 24 where the fixed amount is specific to each financial surrogate.

27. The method of claim 23 where the portion of the billing amount is bounded by a preselected amount that is specific to each financial surrogate.

28. The method of claim 23 where the portion of the billing amount corresponds to charges for communication services of a particular class of services.

29. The method of claim 23 where the step of forwarding a request for payment includes request for payment directed to non-affiliated subscribers.

30. The method of claim 23 where the step of forwarding a request for payment to said financial surrogates includes a discount related to the number of affiliated subscribers of each of said financial surrogates.

31. The method of claim 23 where the financial surrogates belong to a set comprising employers of the affiliated subscribers, banks of the affiliated subscribers, and charge card suppliers of the affiliated subscribers.

32. A method carried out in a computer for billing a party that serves as a financial surrogate for affiliated subscribers of a service provider, the method comprising the steps of:

identifying said affiliated subscribers, from a database maintained by said billing party, as specified by said financial surrogate, each of said affiliated subscribers being financially responsible to said service provider for services provided by said service provider, in the event said financial surrogate fails to pay for said services, for each of the affiliated subscribers, accessing from a billing database charges owed by the affiliated subscriber, accumulating said accessed charges of all of said affiliated subscribers, submitting the accumulated charges to the financial surrogate and forwarding a request for payment to the affiliated subscriber in the event said financial surrogate fails to pay said amount.

33. The method of claim 32 where the charges accessed are for specific type of service.

34. The method of claim 32 where the step of identifying is carried out by accessing an affiliation database controlled by said financial surrogate.

35. The method of claim 32 where in the step of accumulating charges for all of said subscribers, the accessed charges for services to an affiliated subscriber are discounted, relative to charges for similar services that are levied on non-affiliated subscribers.

36. The method of claim 32 where in the step of accumulating charges for said affiliated subscribers, the charges that are accessed for any one affiliated subscriber are bounded by a specific amount.

37. The method of claim 36 further comprising the step of submitting to the affiliated subscriber a request for payment for service charges owed by said affiliated subscriber that are not included in said step of accumulating.

38. The method of claim 37 where the charges submitted to the affiliated subscriber are discounted relative to charges levied for similar service on non-affiliated subscribers.

39. The method of claim 32 where the affiliated subscribers are employees of the financial surrogate.

40. The method of claim 32 where the affiliated subscribers are holders of credit cards issued by the financial surrogate.

41. The method of claim 32 further comprising a step of including charges owed by the financial surrogate for services provided to the financial surrogate.

42. The method of claim 32 further comprising a step of including charges owed by the financial surrogate for services provided to the financial surrogate, discounted by an amount that is related to the number of affiliated subscribers whose charges are submitted to the financial surrogate.

43. The method of claim 32 further comprising a step of including charges owed by the financial surrogate for services provided to the financial surrogate, discounted by an amount that is related to the accumulated charges of affiliated subscribers whose charges are submitted to the financial surrogate.

* * * * *